United States Patent Office 3,605,360
Patented Sept. 20, 1971

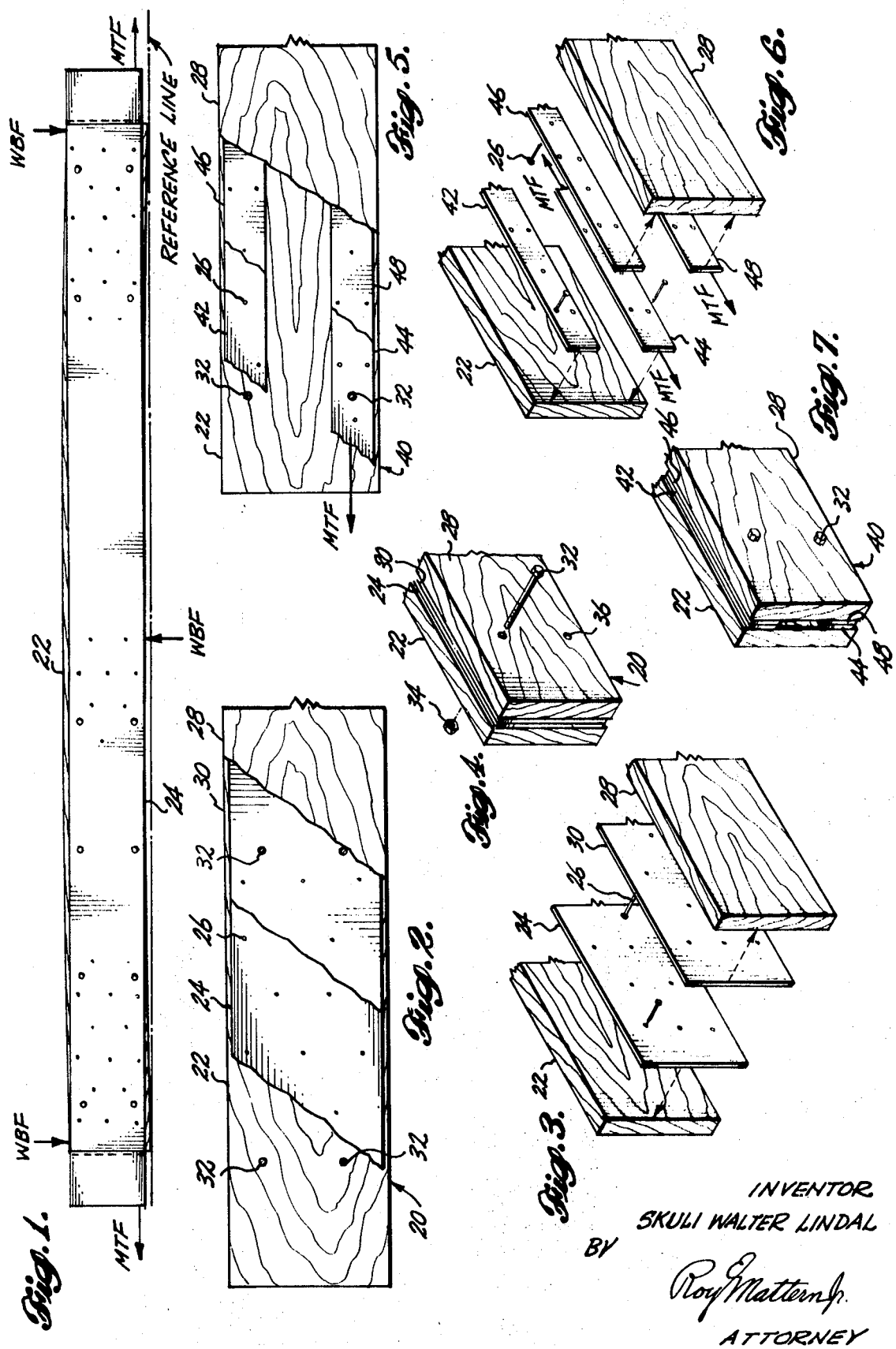

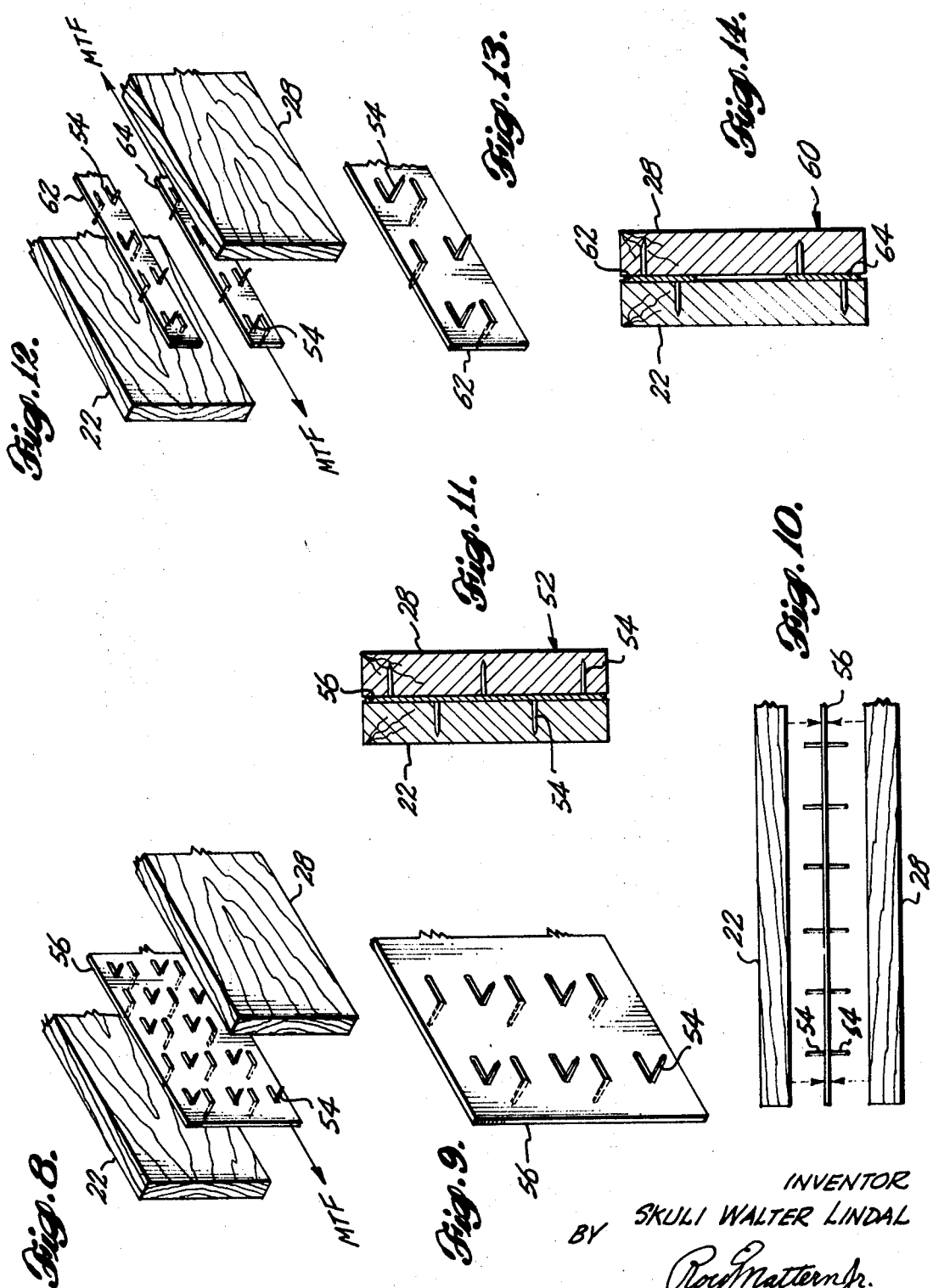

3,605,360
PRESTRESSED VERTICALLY LAMINATED BEAM OF WOOD
Skuli Walter Lindal, 3138 Mountain View W., Tacoma, Wash. 98466
Filed Apr. 24, 1969, Ser. No. 818,990
Int. Cl. E04c 3/10, 3/292
U.S. Cl. 52—223                                    1 Claim

ABSTRACT OF THE DISCLOSURE

During the manufacture of beams, vertical laminations of wood are held securely in an opposite bending moment to that anticipated after their erection in a building. While so held, they are relatively moved to respective sides of a vertical metal lamination or laminations, which in turn are being optionally longitudinally pulled at the bottom of each of their respective ends. Then all vertical laminations are moved together under compressive forces and secured with fasteners. Optionally, the fasteners may be formed from and remain a part of the metal lamination or laminations. After securement by fasteners and then upon release from bending, pulling and compressive forces, the derived prestressed wood and metal beam is ready for inclusion in an overall structure.

BACKGROUND OF THE INVENTION

Wood beams, both laminated and full section, have been used extensively in buildings. When laminated the laminations are generally glued together. No metal has been used with respect to the laminations per se. Principally metal fasteners have been used with wood beams of all types, primarily to secure them to other structures, such as columns.

In contrast this invention utilizes vertical metal laminations and fasteners with wood beams or vertical wood laminations to create a resulting overall prestressed laminated beam of greater strength for its comparative smaller size. The metal fasteners used, optionally, may be formed from and remain a part of the metal lamination or laminations.

SUMMARY

Wood beams and vertical laminations thereof are given an opposite bending moment than that to be expected when thay are installed in a building. While so held, they are joined to vertical metal laminates which optionally may be pulled and longitudinally prestressed at the bottom of the beam. Then upon release, these vertical laminations combine to become pre-stressed composite wood and metal beams of comparatively greater strength than equal sized wood beams. When fasteners only are used their production may be undertaken without incurring delays associated with gluing processes followed in manufacturing glued wood laminated beams. When fasteners and glues are concurrently used there is little or no delay incurred during production of these beams, as metal laminations will hold wood in position while glue cures.

DRAWINGS OF PREFERRED EMBODIMENTS

FIG. 1 is a side elevation of a wood beam or vertical lamination(s) thereof and a vertical metal plate placed adjacent one another, the metal in the foreground being tensioned by forces applied longitudinally at the lower part of its ends and the wood in the background being subjected to bending forces applied vertically at its ends and center;

FIG. 2 is a partial side elevation with portions being broken away, FIG. 3 is a partial perspective exploded view, and FIG. 4 is a partial perspective assembled view, with all FIGS. 2, 3, and 4 showing how paired vertical wood and vertical metal laminations first subjected to the respective force groupings illustrated in FIG. 1, are then joined together by using nail or screw fasteners, and, thereafter, as a pair are joined with a like pair by preferably using bolt and nut fasteners and placing the metal laminations adjacent one another leaving exposed wood surfaces;

FIG. 5 is a partial side elevation with portions being broken away, FIG. 6 is a partial perspective exploded view, and FIG. 7 is a partial perspective assembled view, with all FIGS. 5, 6, and 7, showing how a vertical wood lamination and its upper and lower vertical metal laminations, first subjected to the respective force groupings similar to those illustrated in FIG. 1, are then joined together by using nail or screw fasteners and thereafter, as a respective group are joined with a like group by preferably using bolt and nut fasteners and placing the metal strip laminations adjacent one another leaving exposed wood surfaces;

FIG. 8 is a partial exploded perspective view of vertical wood laminations spaced apart and a vertical metal lamination placed between them, the latter having projecting nail like fasteners extending outwardly on each side which are preferably derived from the metal lamination and remain integral therewith;

FIG. 9 is an enlarged partial perspective view of the vertical metal lamination shown in FIG. 8;

FIG. 10 is a partial top view of the vertical wood laminations and vertical metal laminations shown in FIG. 8, indicating their placement as they are forced in accordance with the demonstration of FIG. 1, and thereafter compressed together as indicated by the arrows used in this FIG. 10;

FIG. 11 is a cross-section of the vertically laminated beam resulting from the assembly of components illustrated in FIGS. 8, 9 and 10;

FIG. 12 is a partial exploded perspective view of vertical wood laminations spaced apart and upper and lower vertical metal laminations placed between them, each of the latter having projecting nail like fasteners extending outwardly on each side which are preferably derived from the metal lamination and remain integral therewith;

FIG. 13 is an enlarged partial perspective view of a vertical metal lamination shown in FIG. 12;

FIG. 14 is a cross section of the vertically laminated beam resulting from the assembly of components illustrated in FIGS. 12 and 13, and following the application of forces as indicated in FIGS. 1 and 10.

DESCRIPTION OF PREFERRED EMBODIMENTS

Introduction to the embodiments

Throughout the figures, various embodiments are shown. In all embodiments vertical wood laminations are placed in bending conditions that are opposite to their anticipated bending under load upon and after their incorporation as a vertical beam laminate in an overall structure. In all embodiments vertical lower metal laminations or lower portions of vertical metal laminations are preferably pulled at each end while being compressed together horizontally with vertical wood laminations while the latter are undergoing their bending.

However, the metal laminations, without first applying an end tensioning pull could be compressed together with wood laminations, while the latter are undergoing their bending. The resulting laminated product would not have as high a prestressed value as the laminated product resulting from both wood and lower metal laminations or lower portions of metal laminations being prestressed. Also for some structural requirements, only pre-stressing of the lower metal laminations or lower portions of metal laminations would be undertaken.

The number of vertical laminations of both wood and metal are also increased to provide a beam of greater strength. Fasteners derived directly by cutting, bending, and/or punching are preferred to increase the speed and or punching are preferred to increase the speed and efficiency of production. Moreover, the integral derivation of the fastening means enhances the resulting overall strength of the vertically laminated beams.

In the following descriptions of illustrated embodiments in obtaining the greatest pre-stressed strength values, all vertical wood laminates are being subjected to bending forces as indicated in FIG. 1, and the lower part of vertical metal laminates are being subjected to tensioning forces as also indicated in FIG. 1. Then as each vertical lamination is being prestressed, all vertical laminations are moved together under compressive forces as indicated in FIG. 10.

At all times vertical metal laminations and vertical wood laminations after their prestressing and joining are held adjacent one another with added fasteners and/or fasteners derived from metal laminations and kept integral therewith. Subsequent to such fastening, any projecting metal portions are preferably cut flush with the wood laminations completing a vertically laminated prestressed wood and metal beam.

Full depth metal and wood vertical laminations held together by non integral fasteners In FIGS. 2, 3 and 4, a prestressed beam 20 is shown wherein a vertical wood lamination 22 is placed in bending, as shown in FIG. 1, opposite to the bending anticipated during its incorporation in an overall structure, the bending forces being indicated by W.B.F. designating wood bending forces. Adjacent to wood lamination 22, a substantially full depth vertical metal lamination 24 is placed and pulled at the bottom of each of its ends by forces being indicated by M.T.F., designating metal tension forces. While both wood lamination 22 and metal lamination 24 are so prestressed, they are compressed together by forces as indicated in FIG. 10, and fastened by nails 26 as shown in FIGS. 2 and 3, or by screws, not shown.

This pair of vertical laminations is duplicated in like manner using wood laminate 28 and metal laminate 30. Although each pair could be used independently as a beam, preferably, one pair is turned end for end and then the two pairs are moved together and secured by tightening bolts 32 and nuts 34, passing through holes 36, preferably leaving wood surfaces exposed, as illustrated in FIG. 4.

Full depth vertical wood laminations and upper and lower vertical strip metal laminations held together by non integral fasteners In FIGS. 5, 6, and 7, a prestressed beam 40 is shown which is manufactured in a manner similar to that followed in making beam 20, shown in FIG. 2. However, instead of using full depth vertical metal laminations, upper metal strips 42, 46 and lower metal strips 44, 48 which can be optionally pretensioned are utilized in the critical or active stress locations or zones above and below the neutral axis of the resulting beam, resulting in an open space between them.

Full depth vertical wood laminations and a single full depth vertical metal lamination having integral fasteners In FIGS. 8, 9, 10, and 11, a prestressed beam 52 is shown which is manufactured by creating integral nail like fasteners 54, extending alternately in opposite directions from a full depth vertical metal lamination 56. Then metal lamination 56 is pulled at the bottom of each of its ends. Adjacent to each of its sides vertical wood laminates 22, 28 are placed in bending opposite to the bending anticipated after their incorporation in an overall structure, not shown. When so prestressed, as indicated by the force direction arrows of FIG. 1, these metal and wood vertical laminations are compressed together as indicated by the force direction arrows of FIG. 10. During such compression, fasteners 54 penetrate the wood laminations and thereafter hold together the entire prestressed beam 52.

Full depth vertical wood laminations and upper and lower vertical strip metal laminations having integral fasteners In FIGS. 12, 13, and 14, a prestressed beam 60 is shown which is manufactured in a manner very similar to the method of making beam 52 illustrated in FIGS. 8, 9, 10, and 11. However, instead of a full depth vertical metal lamination 56, an upper vertical metal lamination 62 and a lower vertical metal lamination 64 which may be pretensioned are used in the active or critical stress zones or locations above and below the neutral axis of the resulting beam 60, resulting in an open space between them.

Method of manufacture

To obtain maximum benefit of prestressing the vertical laminations, preferably all wood vertical laminations are subjected to bending moments that are opposite to those anticipated when a beam is installed in an overall structure. Therefore a beam of vertical laminate is subjected to a force at its midpoint along its bottom and to two forces, one at each respective end in the opposite direction at its top. Such bending moment is maintained until full securement of a vertical metal lamination is completed under horizontal compressive forces.

In continuing the method of manufacture to obtain maximum benefit of prestressing the lamination, preferably lower metal laminations are subjected to tensile forces in the longitudinal direction. Such tension is maintained until full securement of the vertical wood laminations are completed under compressive forces.

Fastening may follow conventional utilization of nails, screws and/or bolts. Preferably, nail-like fasteners are derived from and continue to remain integral with vertical metal laminations.

Summary of principal advantages of prestressed vertically laminated beams composed of wood and metal vertical laminations As indicated throughout the descriptions of the resulting representative embodiments, the major purpose is to combine vertical wood and vertical metal to acquire the summation and/or integration of their beneficial properties. Various prestressing of respective vertical laminations would be undertaken depending on the resulting strengths specified with respect to an overall structure. Generally the maximum prestressing will be undertaken, wherein each vertical wood lamination will be subjected to bending forces opposite to those anticipated when the resulting vertical laminated beam is installed and also a vertical lower metal lamination or lower portion of a vertical metal lamination will be pulled placing it in tension, as it is secured between other vertical laminations when compressive assembly forces are applied.

Fastening at all times is readily undertaken and preferably the fasteners are derived in whole or in part from the metal laminations. Although nail, screw, bolt and nut fastening is often adequate even greater strength is obtained by using fluid bonding agents. Even when they are used, production delays formerly associated with waiting periods while bonding agents set and/or cured, are generally eliminated.

At all times there is a flexibility in planning production runs to create vertically laminated beam products meeting different requirements of size, strength and appearance. Preferably the appearance of wood grain on the beam exteriors results, however, if ever a customer ordered the appearance of a metal surface, the order could be filled without difficulty.

I claim:

1. A prestressed vertically laminated beam of vertical wood and vertical metal laminations, comprising:
   (a) vertical wood laminations spaced apart and forcibly bent, each being lowered on its end and raised at its midpoint; and
   (b) upper and lower vertical pretensioned metal strips positioned to leave a clear space along the neutral axis elevation, each metal strip being machined to present nail-like projections in two opposite directions, and each lower metal strip being forcibly tensioned longitudinally, and then during horizontal compression of all vertical laminations, the integral nail-like projections secure the vertical laminations together in their respective prestressed configurations.

References Cited

UNITED STATES PATENTS

| | | | |
|---|---|---|---|
| 692,909 | 2/1902 | Roberts | 52—622X |
| 2,039,398 | 5/1936 | Dye | 52—730 |
| 2,159,955 | 5/1939 | Scales | 52—730X |
| 2,342,916 | 2/1944 | Blaski | 52—730X |
| 2,389,944 | 11/1945 | Winkel | 52—622X |
| 3,294,608 | 12/1966 | Peterson | 52—223X |

FOREIGN PATENTS

| | | | |
|---|---|---|---|
| 203,684 | 4/1966 | Sweden | 52—730 |

PRICE C. FAW, Jr., Primary Examiner

U.S. Cl. X.R.

52—730